Patented Apr. 13, 1954

2,675,387

UNITED STATES PATENT OFFICE 2,675,387

N,N'-BIS(AMINOALKYL) DERIVATIVES OF IMIDAZOLIDINES AND HEXAHYDROPYRIMIDINES

John O. Van Hook, Roslyn, and W E Craig, Philadelphia, Pa., assignors to Rohm & Haas Company, Philadelphia, Pa., a corporation of Delaware No Drawing. Application January 29, 1953, Serial No. 334,078

6 Claims. (Cl. 260—256.4)

This invention relates to compounds of the structure

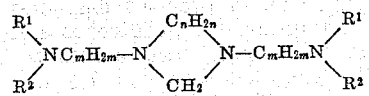

and to a method for their preparation. In this formula $R^1$ and $R^2$ are alkyl groups of not over eight carbon atoms, preferably of two to five carbon atoms, or aralkyl groups, or cycloalkyl groups, $m$ is an integer from two to six, and $n$ is an integer of two to three, there being at least two carbon atoms between nitrogen atoms.

These compounds have marked fungicidal action. They serve as poisons against chewing insects. They have bactericidal value. Some act as antiviral agents. Furthermore, these compounds act as corrosion inhibitors and serve as chemical intermediates.

These compounds are prepared by reacting by condensing together formaldehyde and a polyamine of the structure

where $R^1$, $R^2$, $m$, and $n$ have the meanings given above. The reaction is carried out between 0° and 140° C., desirably in the presence of an inert organic volatile solvent, such as naphtha, benzene, toluene, xylene, methanol, ethanol, and the like. Solvents which form azeotropes with water are particularly convenient to use.

These polyamines are readily prepared, as is known, from amines of the formula

by reaction of this amine with an alkylene dihalide of two to three carbon atoms. Ethylene dichloride, propylene dibromide, and trimethylene dibromide serve well for this purpose. The diamine is best used in excess over theoretical requirements. The reaction is carried out by mixing the reactants at 50° to 150° C. and taking up the hydrogen halide split out with a base, such as sodium hydroxide. The product may be separated and purified by distillation.

Various methods are found in the literature for preparing diamines of the above type and these are readily adaptable to the introduction of different tertiary amine groups and different alkylene groups or the equivalent cycloalkylene group. Other methods follow conventional procedures for introducing these parts in the diamine structure. Some of the diamines have been made available by chemical manufacturers. Others can be prepared by methods such as are shown in Journal of the American Chemical Society 63, 156; 66, 725; 67, 686; 68, 1859, and 72, 81.

As initial materials, there may be taken such amines as 2-(dimethylamino)ethylamine, 4-(dimethylamino)butylamine, 5-(dimethylamino)pentylamine, 6-(dimethylamino)hexylamine, 3-(diethylamino)propylamine, 3-(dibutylamino)propylamine, 3-(dioctylamino)propylamine, 3-(dibenzylamino)propylamine, 3-(N-benzyl-N-methylamino)propylamine, 3-(dicyclohexylamino)propylamine, 3-(di-2-ethylhexylamino)propylamine, 3-(diisopropylamino)propylamine, 3-(dibenzylamino)pentylamine, 3-(dicyclohexylamino)pentylamine, and 5-(diethylamino)-2-pentylamine.

When these amines are reacted with an alkylene dihalide of two to three carbon atoms, there result such compounds as N,N'-bis(2-dimethylaminoethyl)-1,2-ethylenediamine, N,N'-bis(2-dimethylaminoethyl)-1,3-propanediamine, N,N'-bis(2-dibutylaminoethyl)-1,2-propanediamine, N,N'-bis(dibenzylaminopropyl)-1,3-propanediamine, N,N'-bis(dicyclohexylaminopropyl)-1,2-ethylenediamine, N,N'-bis(dioctylaminopropyl)-1,3-propanediamine, and so on.

Formaldehyde may be used in the form of aqueous 30% to 50% solution or in the form of a revertible polymer or as a mixture of these forms. Desirably formaldehyde is used in excess. Conveniently the diamine and formaldehyde are mixed, desirably at low temperature, and the reaction usually completed with heating. Heating under reflux with removal of water is a preferred method. The reaction product is first obtained as a residue upon evaporation of solvent. In some cases it can be purified by distillation under reduced pressure, but this is not essential. Mere stripping off of volatile materials leaves a remarkably pure product in all cases where the reacting polyamine is reasonably pure.

Additional details of preparing compounds of this invention are given in the following illustrative examples. Parts are by weight.

Example 1

A portion of 325 parts of 3-diethylaminopropylamine is stirred and heated to 100° C. Thereto is added trimethylene dibromide at a rate to maintain the temperature of the reaction mixture at 100°–130° C. Addition is made of 125 parts of this dibromide. The reaction mixture is then heated at 130°–140° C. for two hours. It is cooled to about 100° C. and made alkaline by addition of 120 parts of 50% sodium hydroxide solution. An organic layer forms and is separated. It is distilled to give 130 parts of recovered 3-diethylaminopropylamine, distilling at 45°–110°

C./1 mm., and 110 parts of N,N'-bis(3-diethylaminopropyl)-1,3-propylenediamine, distilling at 165°–190° C./0.3 mm. This compound has a refractive index of 1.4679 at 20° C. It contains by analysis 18% of nitrogen. The theory for $C_{17}H_{40}N_4$ is 18.7% of nitrogen.

There are mixed 45 parts of N,N'-bis(3-diethylaminopropyl)trimethylenediamine, 13 parts of aqueous 37% formaldehyde solution, and 88 parts of benzene. This mixture is heated under reflux, a trap being used to separate water. After the reaction mixture has been thus heated for three hours, the mixture is distilled. At 130°–145° C./0.3 mm. there is taken a fraction of 40 parts of N,N'-bis(3-diethylaminopropyl) hexahydropyrimidine. This product yields 17.5% of nitrogen (theory 18%) and 9.1% of formaldehyde (theory 9.6%). It has a refractive index at 20° C. of 1.4763.

Evaluation of this compound in standard fungitoxicity tests demonstrates that the above compound gives 100% inhibition of the germination of spores of *Macrosporium sarcineforme* and *Sclerotinia fructicola* at a concentration as low as 0.005%. At 0.001% it inhibits germination of spores of the former organism to the extent of 64% and of the latter to the extent of 97%.

Example 2

There are reacted as above 3-diethylaminopropylamine and ethylene dichloride to give N,N'-bis(diethylaminopropyl)ethylenediamine. There are then mixed 57 parts of this compound, 20 parts of 36% formaldehyde solution, and 100 parts of benzene. The mixture is heated under reflux with separation of water. The reaction mixture is then stripped by heating to 120° C./1 mm. The residue, a light colored oil, is N,N'-bis(diethylaminopropyl)imidazolidine. It has a refractive index at 20° C. of 1.4787 and contains 18% of nitrogen and gives 9% of formaldehyde when digested with phosphoric acid (theory 18.8% and 10%, respectively).

This compound was examined for its fungitoxicity by standard tests. At a concentration of 0.005% it showed 98% inhibition of germination of spores of *Sclerotinia fructicola* and 100% inhibition of germination of spores of *Macrosporium sarcineforme*. It should be here commented that the dialkylaminoalkyl compounds of this invention and also their equivalent diaralkyl and dicycloalkyl analogues are very effective fungicidal agents.

Example 3

There is likewise prepared bis(diamylaminoethyl)ethylenediamine from diamylaminoethylamine and ethylene dibromide. The product is taken at 190°–210° C./0.1 mm. It contains 13% of nitrogen (theory 13.3%). This polyamine is reacted with formaldehyde as above. The reaction mixture is stripped to give a light colored oil which contains 12.8% of nitrogen and 6.5% of formaldehyde (theory 12.9% and 6.9%, respectively). A portion of this oil is distilled at 165°–190° C./0.1 mm.

Example 4

There is prepared dicyclohexylaminoethylamine and from this by reaction with ethylene dichloride there is obtained bis(dicyclohexylaminoethyl)ethylenediamine, distilling at 210°–230° C./<1 mm. This polyamine is reacted with formaldehyde as above and the reaction mixture is stripped by heating to 140° C./1 mm. There is obtained a viscous residue which contains 11.3% of nitrogen and yields 6% of formaldehyde (theory 11.5% and 6.17%, respectively).

In the same way other cycloaliphatic amines, such as dicyclopentylamine, di(methylcyclohexyl)amine, cyclohexylmethylamine, and the like may be converted to cycloalkylaminoalkylamines, which in turn are condensed with an ethylene or propylene dibromide or dichloride to give a polyamine. This in turn is reacted with formaldehyde to give a cyclic compound of this invention.

Example 5

In the same way there are reacted 10 parts of trimethylene dibromide and 30 parts of dibenzylaminopropylamine. The reaction mixture is stripped at 140° C./<1 mm., there being obtained as a residue 1,3-bis(dibenzylaminopropyl)-propylenediamine, containing 10.1% of nitrogen (theory 10.2%). Reaction of this product with formaldehyde as in previous examples gives a product containing 10% of nitrogen and yielding 5% of formaldehyde. This agrees with corresponding theoretical values (10% and 5.35%) for N,N'-bis(dibenzylaminopropyl)hexahydropyrimidine.

Example 6

There are mixed 10 parts of ethylene dichloride and 50 parts of 5-dimethylaminopentylamine. The reaction mixture is stirred and heated for six hours with the reaction temperature being carried to 140° C. The reaction mixture is treated with excess sodium hydroxide solution. The organic layer is then distilled. After starting amine has been recovered, there is taken off at 130°–150° C./1 mm. a fraction which corresponds in composition to bis(dimethylaminopentyl)ethylenediamine. It contains 19.6% of nitrogen (theory 19.6%).

This product is reacted with a solution of paraformaldehyde in methanol and then heated with toluene to remove water. The mixture is then stripped with the temperature being carried to 120° C./1 mm. Between 120° and 140° C./< 1 mm. a product is distilled which contains 19% nitrogen and yields 9.8% formaldehyde, corresponding in composition to N,N'-bis(dimethylaminopentyl)imidazolidine, for which corresponding theoretical values are 19.0% and 10%, respectively.

We claim:

1. As new chemical compositions, compounds of the structure

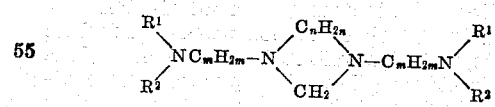

wherein $R^1$ and $R^2$ are selected from the class consisting of alkyl, cyclohexyl, and benzyl groups of not over eight carbon atoms, $m$ is an integer from two to six, and $n$ is an integer of two to three.

2. As a new chemical composition, N,N'-bis(diethylaminopropyl)imidazolidine.

3. As a new chemical composition, N,N'-bis(diethylaminopropyl)hexahydropyrimidine.

4. As a new chemical composition, N,N'-bis(diethylaminoethyl)imidazolidine.

5. As a new chemical composition, N,N'-bis(diethylaminoethyl)hexahydropyrimidine.

6. As a new chemical composition, N,N'-bis(dimethylaminopentyl)imidazolidine.

No references cited.